(12) United States Patent
Hart

(10) Patent No.: US 8,971,213 B1
(45) Date of Patent: Mar. 3, 2015

(54) PARTIAL ASSOCIATION IDENTIFIER COMPUTATION IN WIRELESS NETWORKS

(75) Inventor: Brian Donald Hart, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 164 days.

(21) Appl. No.: 13/317,512

(22) Filed: Oct. 20, 2011

(51) Int. Cl.
H04L 12/28 (2006.01)

(52) U.S. Cl.
USPC .......................................................... 370/255

(58) Field of Classification Search
USPC .......................................................... 370/255
See application file for complete search history.

(56) References Cited

U.S. PATENT DOCUMENTS

| 7,673,223 | B2* | 3/2010 | Richardson et al. | 714/780 |
|---|---|---|---|---|
| 7,948,991 | B1 | 5/2011 | Hart et al. | |
| 8,184,564 | B2* | 5/2012 | Kinder et al. | 370/311 |
| 2005/0201342 | A1* | 9/2005 | Wilkinson et al. | 370/338 |
| 2010/0002721 | A1* | 1/2010 | Eller et al. | 370/466 |
| 2011/0110293 | A1 | 5/2011 | Hart et al. | |
| 2011/0194475 | A1* | 8/2011 | Kim et al. | 370/311 |
| 2011/0194780 | A1* | 8/2011 | Li et al. | 382/218 |
| 2011/0222486 | A1 | 9/2011 | Hart | |
| 2012/0044925 | A1* | 2/2012 | Lee et al. | 370/338 |
| 2012/0230349 | A1* | 9/2012 | Sakoda | 370/445 |

* cited by examiner

Primary Examiner — Dang Ton
Assistant Examiner — Nourali Mansoury
(74) Attorney, Agent, or Firm — Cindy Kaplan

(57) ABSTRACT

In one embodiment, a method includes generating for a client device associated with an access point, a partial association identifier based on an association identifier assigned to the client device and a hash of a basic service set identifier the client device is associated with, and transmitting a packet to the client device, the packet comprising the partial association identifier. The partial association identifier indicates that the packet is intended for the client device. An apparatus is also disclosed.

14 Claims, 5 Drawing Sheets

PARTIAL ASSOCIATION IDENTIFIER COMPUTATION IN WIRELESS NETWORKS

TECHNICAL FIELD

The present disclosure relates generally to wireless networks, and more particularly, to computation of a partial association identifier for use in power savings in wireless networks.

BACKGROUND

Wireless local area networks (WLANs) continue to evolve. Development of WLAN standards such as the Institute of Electrical and Electronics Engineers (IEEE) 802.11 have improved data throughput. The latest draft, IEEE 802.11 ac, plans to improve the 802.11 WLAN user experience by providing significantly higher basic service set (BSS) throughput for existing WLAN application areas. IEEE 802.11 was designed with power savings for stations (clients) in communication with access points. For power savings, IEEE 802.11ac defines an identifier (referred to as a partial association identifier (partial AID)) used to provide an indication to stations whether or not the frame is intended for the station. If the frame is not intended for the station, the station can sleep through the remainder of the frame. For maximum power savings, it is desirable for overlapping BSSs to allocate different partial AIDs to different stations.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
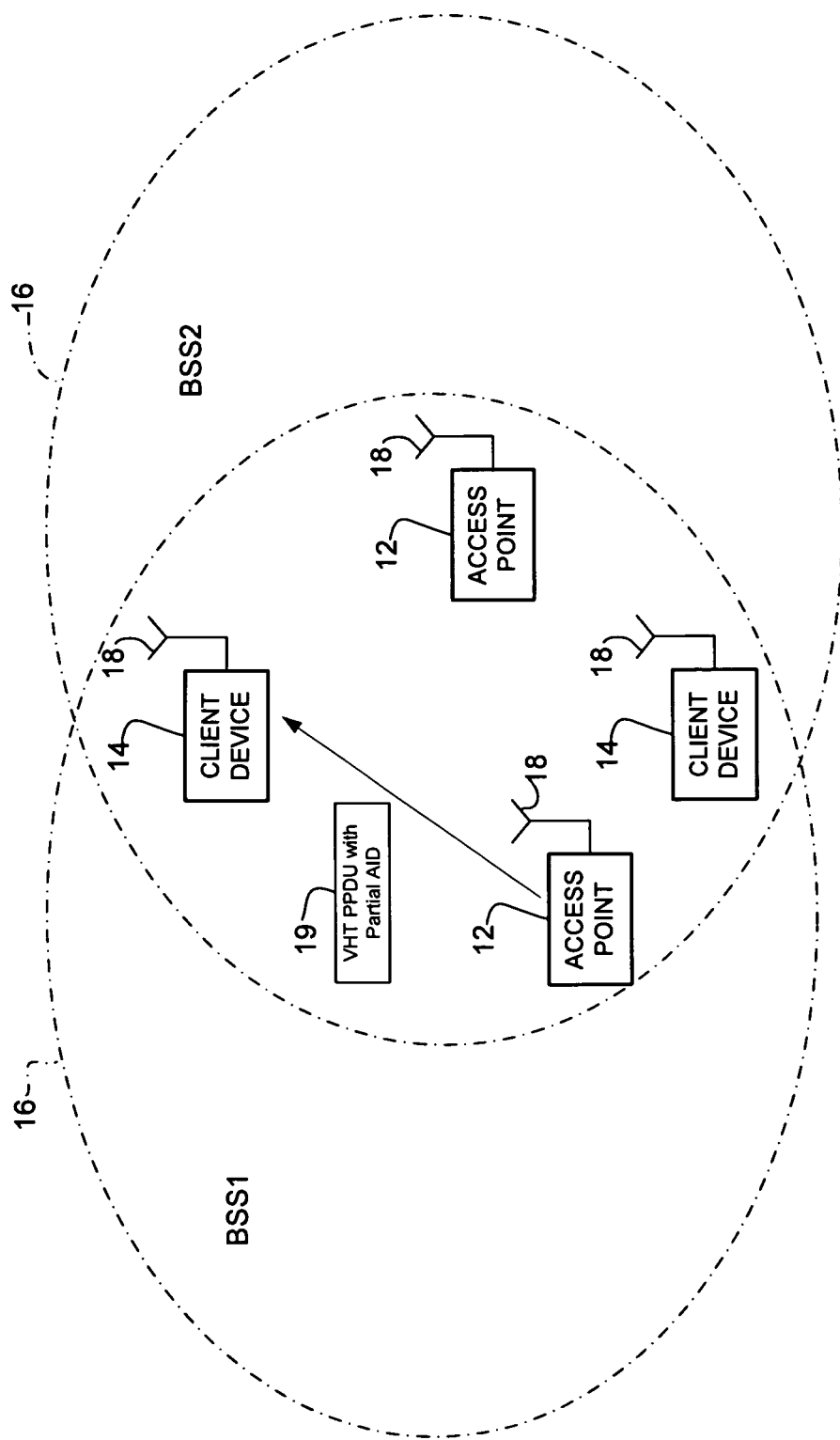
FIG. 1 illustrates an example of a network in which embodiments described herein may be implemented.

In one embodiment, a method generally comprises generating for a client device associated with an access point, a partial association identifier based on an association identifier assigned to the client device and a hash of a basic service set identifier the client device is associated with, and transmitting a packet to the client device, the packet comprising the partial association identifier. The partial association identifier indicates that the packet is intended for the client device.

In another embodiment, an apparatus generally comprises a processor for creating a watch list comprising a partial association identifier generated based on an association identifier assigned to the apparatus and a hash of a basic service set identifier the apparatus is associated with, determining if a received packet contains the partial association identifier on said watch list, and processing the packet if the packet contains the partial association identifier. The apparatus further includes memory for storing the partial association identifier.

In yet another embodiment, an apparatus generally comprises a processor for generating a partial association identifier for a client device associated with an access point, the partial association identifier based on an association identifier assigned to the client device and a hash of a basic service set identifier the client device is associated with, and creating a packet for transmittal to the client device, the packet comprising the partial association identifier. The apparatus further comprises memory for storing the partial association identifier, which indicates that the packet is intended for the client device.

EXAMPLE EMBODIMENTS

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Wireless local area networks (WLANs) typically include an access point (AP) and one or more client devices (also referred to as clients or stations). When the client associates with the access point, the access point assigns a value called an association identifier (AID) to the client. The AID is a numeric valued assigned by the access point to identify the association. The access point may use the AID, for example, to find frames buffered for the client. The access point buffers frames for a client when the client is in power save mode and transmits them later when the access point knows that the client will listen, to assist the clients with power savings. A Traffic Indication Map (TIM) information element is sent to the network to indicate which stations have buffered traffic waiting to be picked up. The TIM includes bits representing the AID of a client.

Draft standard IEEE 802.11 ac defines a partial AID (association identifier) field that provides an indication to the client whether or not a frame (packet) is intended for that client. If the frame is not intended for the client, the client can sleep through the remainder of the frame. The partial association identifier is based on the association identifier described above. For example, the partial AID may be a set number of least significant bits (LSBs) of the AID. For maximum power savings, it is desirable for overlapping basic service sets (BSSs) to allocate different partial AIDs to different clients. However, for maximum TIM compression, it is desirable to have the AIDs within a BSS clustered within a narrow range. For transmitted BSSIDs (i.e., conventional BSSIDs) the groupcast AID is set to 0 whereas, in the IEEE 802.11v Multi-BSSID feature, the groupcast AID of a non-transmitted BSSID is set to a low value. For these and related reasons, the AIDs assigned to clients are typically clustered around zero, especially for the case of Method A TIM encoding defined by IEEE 802.11v. This results in two objectives in tension; spreading out the AIDs for client power savings and clustering the AIDs around zero to maximize TIM compression.

One option to reduce partial AID collisions is to partition the partial AID. For example, the partial AID may be renamed to a partial station AID which includes a random partial BSSID and a reduced partial AID field.

Another option to reduce partial AID collisions is to add an offset determined from the AP MAC (Media Access Control) address plus bits from the AID. An offset may be, for example, X LSBs from the AP MAC address. However, many access points are assigned 8, 16, or 32 contiguous MAC addresses, of which only 1, 2, or 3 may be in use at any one time. Therefore, X LSBs from the AP MAC address can also have low entropy in practice.

The embodiments described herein provide a calculation for partial AID that significantly reduces the likelihood of partial AID collisions, even for overlapped APs that are assigned 8, 16, or 32 contiguous MAC addresses, whether or not the deployment uses one, some, or all of the MAC addresses from that range. The calculation has very low complexity. As described below, the partial association identifier is based on the client association identifier and a hash of a basic service set identifier (BSSID). In one embodiment, the hash provides an offset computed based on the BSSID. Based on typical BSSID assignments in enterprise deployments, low order bits (i.e., the bits transmitted later in time in an 802.11 frame) of the BSSID might show similar values. Therefore, it is preferred to compute a hash of the BSSID accounting for higher order bits. The use of the station AID is efficient because the stations already have the AID. The offset reduces the probability of collision between the partial AID of overlapping BSSs. Since the AIDs are unique within a BSS, the offset generally makes them different across overlapping BSSs and therefore avoids partial AID overlap between the BSSs of multiple BSS APs. The increased probability that the partial AID will be unique across overlapping BSSs provides increased power savings.

Referring now to the drawings, and first to FIG. 1, an example of a network in which embodiments described herein may be implemented is shown. For simplification, only a small number of network devices are shown. The network includes two access points (APs) 12 and two client devices (stations) 14, each associated with one of the access points. The client device 14 may be, for example, a personal computer, laptop, mobile device (e.g., phone, tablet, personal digital assistant), or any other wireless device. The AP 12 is also in communication with a wired network (not shown). Each AP 12 may serve any number of client devices 14 in a BSS 16. The APs 12 and client devices 14 are located in overlapping BSSs (BSS1, BSS2) 16 and communicate in a wireless network via antennas 18. The BSS 16 includes the AP 12 and associated stations 14. Each BSS 16 is identified by a BSSID (basic service set ID), which corresponds to a MAC address of the AP 12. An SSID (service set ID) identifies a particular IEEE 802.11 wireless LAN. The APs 12 and client devices 14 are configured to perform wireless communication according to a wireless network communication protocol such as IEE 802.11ac, for example.

As described in detail below, the AP 12 transmits packets 19 (e.g., VHT (very high throughput) PLCP (physical layer convergence procedure) packets), which contain a partial AID to indicate whether the client 14 does not need to further process the packet. In one embodiment, the partial AID is generated based on the AID and a hash of the BSSID. The client device 14 computes a watch list comprising the partial AID for use in determining which packets 19 to ignore and conversely which packets to further process. If the packet 19 can be ignored by the client 14, the client can sleep through the remainder of the frame.

It is to be understood that the network shown in FIG. 1 and described herein is only an example and that other networks having different components or configurations may be used, without departing from the scope of the embodiments. For example, TDLS (tunneled direct link setup) may be used to provide a direct link between two non-AP stations.

Figure 2:
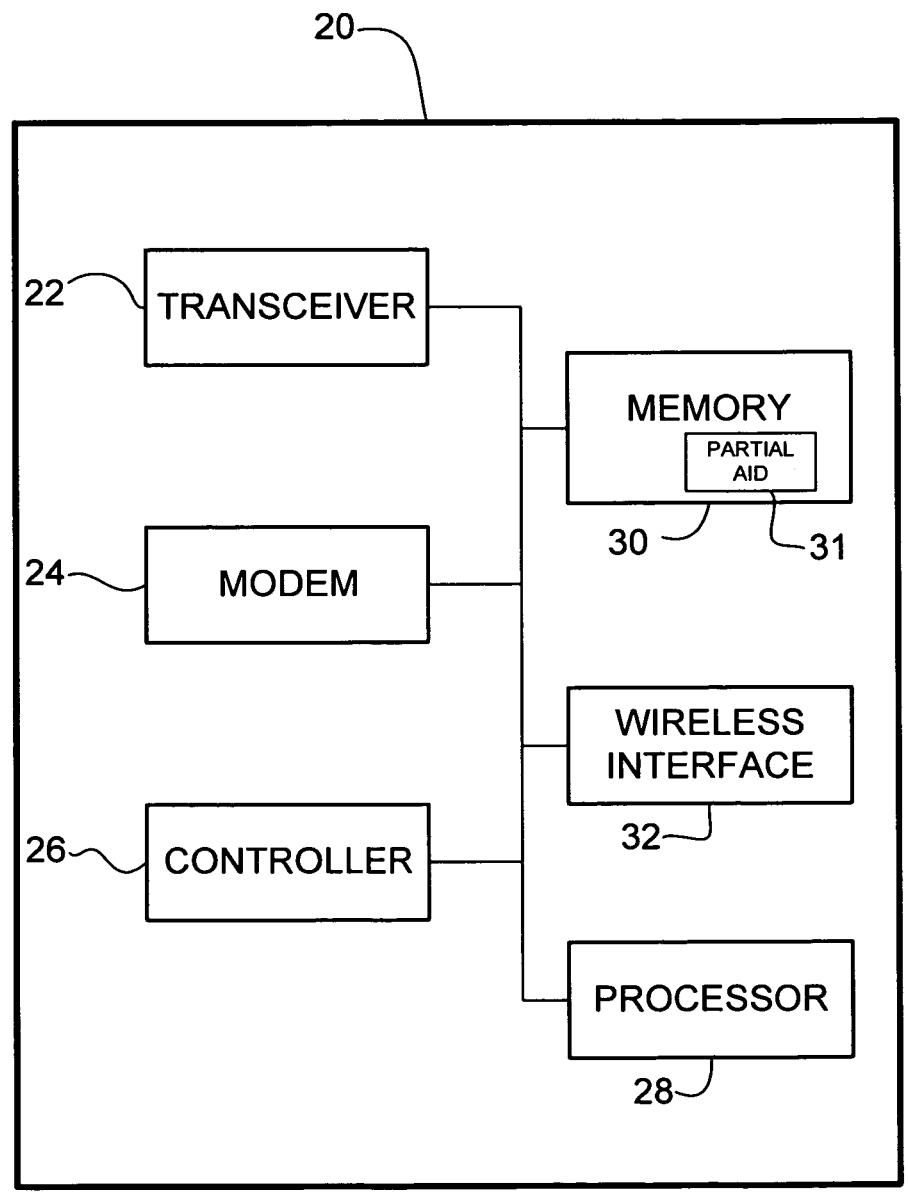
FIG. 2 depicts an example of a network device useful in implementing embodiments described herein.

FIG. 2 is a block diagram illustrating an example of a wireless device (e.g., access point, client device) 20 that may be used to implement embodiments described herein. In one embodiment, network device 20 is a programmable machine that may be implemented in hardware, software, or any combination thereof. The device includes a transceiver 22, modem 24, controller 26, processor 28, memory 30, and wireless interface 32 (e.g., IEEE 802.11 WLAN interface).

The transceiver 22 comprises a combined transmitter and receiver, however, the device may also be configured with a separate transmitter and receiver or any number of transmitters or receivers. The modem 24 is configured to implement modulation and framing of signals according to the applicable communication protocol or standard (e.g., IEEE 802.11) under control of the controller 26.

The controller 26 includes logic to implement embodiments described herein from the perspective of the AP 12 or client device 14. The logic may be encoded in one or more tangible media (memory 30) for execution by the processor 28. The logic may be in the form of software executed by the processor 28, digital signal processor instructions, or in the form of fixed logic in an integrated circuit, for example. Logic may be encoded in one or more tangible computer readable media for execution by the processor 28. For example, the processor 28 may execute codes stored in a computer readable medium such as memory 30. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

Memory 30 may be a volatile memory or non-volatile storage, which stores various applications, modules, and data for execution and use by the processor 28. For example, the memory 30 may store the BSSID, association identifier, and partial association identifier 31 at the client 14, or multiple AIDs and partial AIDs for different clients at the AP 12.

The wireless interface 32 may comprise any number of interfaces for receiving or transmitting data. The network device 20 may also include a wired network interface (not shown) for communication with a LAN, for example.

It is to be understood that the network device 20 shown in FIG. 2 and described above is only an example and that network devices having different components and configurations may be used without departing from the scope of the embodiments. For example, the network device 20 may further include any suitable combination of hardware, software, algorithms, processors, DSPs (digital signal processors), devices, components, or elements operable to facilitate the capabilities described herein.

Figure 3:
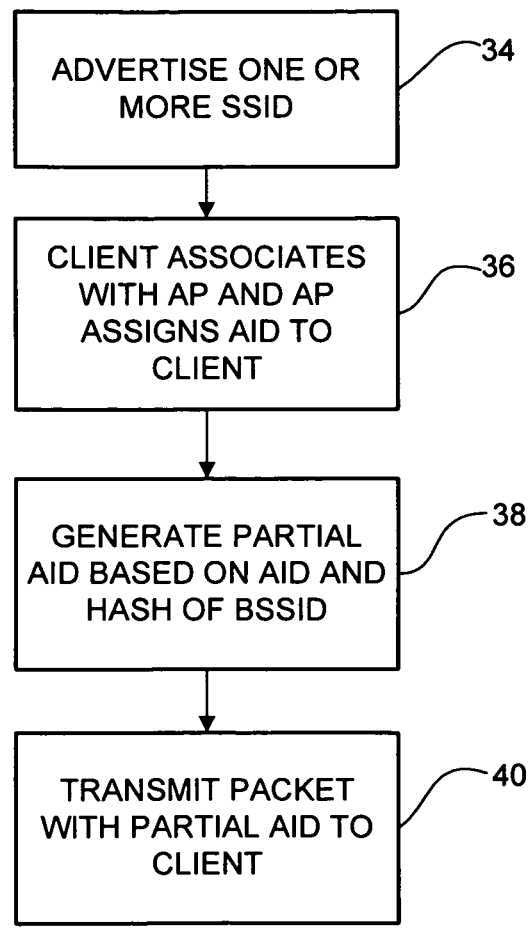
FIG. 3 is a flowchart illustrating a process at an access point for generating a partial association identifier for a client, in accordance with one embodiment.

FIG. 3 is a flowchart illustrating a process at the access point 12 for generating a partial AID for the client 14, in accordance with one embodiment. The AP 12 is configured with one or more MAC addresses. For example, the AP manufacturer may assign a MAC address range to the AP 12. Different MAC addresses (BSSIDs) may be used for different groups of clients (e.g., guests, employees, etc.). At step 34, the AP advertises one or more SSID. Each SSID identifies a particular WLAN. The client device 14 receives a message from all access points within range advertising their SSIDs and can then select the network with which to associate. The client device 14 performs association with the AP 12 and the AP assigns an association identifier to the client during the association process (step 36). The AP 12 generates the partial AID at step 38. As described in detail below, the partial AID is based on the station AID and a hash of the BSSID (e.g., offset based on the BSSID). The AP 12 may precompute the partial AID of the client and cache the calculation. The AP 12 transmits packets 19 to the client 14 containing the partial AID (step 40). In one embodiment, the partial AID is transmitted in a PLCP header as described below with respect to FIG. 5.

The AP 12 may learn through uplink transmissions received from the client 14 when the client associates with the AP, which version of the IEEE 802.11 standard the client is using. The AP 12 may use this information to generate partial AIDs only for those clients 14 operating according to IEEE 802.11ac (or other format using partial AIDs).

Figure 4:
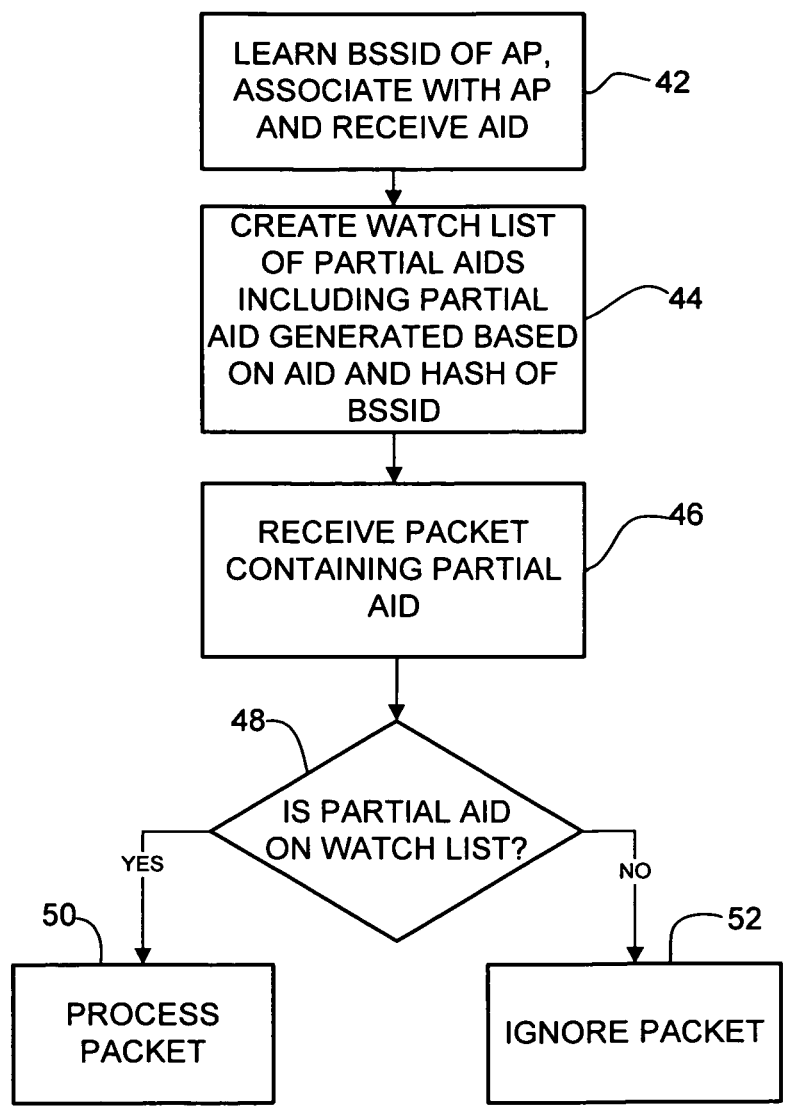
FIG. 4 is a flowchart illustrating a process at a client for using the partial association identifier to identify frames directed to the client, in accordance with one embodiment.

FIG. 4 is a flowchart illustrating an example of a process at a client device 14 for using the partial AID for power savings, in accordance with one embodiment. At step 42, the client 14 learns the BSSID of the AP 12, associates with the AP, and is assigned an association identifier. The client 14 computes a watch list comprising the partial AID (step 44). The watch list may comprise only the partial AID described herein or additional partial AIDs or other identifiers for use in identifying packets intended for the client. At step 46, the client 14 receives packets from the AP 12. If the packet does not contain a partial AID (e.g., is not an IEEE 802.11ac packet), the client performs conventional processing (e.g., in accordance with earlier versions of IEEE 802.11). If the packet contains a partial AID, the client determines if the packet contains a partial AID on the watch list (step 48). If the packet contains a partial AID on the watch list, the client 14 processes the packet (step 50). If the packet does not contain a partial AID on the watch list, the client ignores the packet (i.e., stops receiver processing) (step 52).

It is to be understood that the processes illustrated in FIGS. 3 and 4 are only examples and that steps may be modified, added, reordered, or combined, without departing from the scope of the embodiments.

As previously described, the partial AID is calculated based on the station AID and a hash of the BSSID. The following describes one example for calculating the partial AID for AP-to-STA (station) or TDLS (Tunneled Direct Link Setup) PPDUs (PLCP (physical layer convergence procedure) protocol data units) or DLS (Direct Link Setup) PPDUs.

In one embodiment, the partial AID is set equal to a set number of LSBs of (STA AID+offset based on BSSID). In one example, the partial AID contains the modulo sum of the 9 LSBs of the receiving STA AID and an offset computed based on the BSSID, as follows:

$$(dec(AID[0:8]) + dec(BSSID[44:47] \oplus BSSID[40:43]) \times 2^5) \bmod 2^9$$

where:
AID [b:c] represents bits b through c inclusive of the AID of the recipient station with bit 0 being the first transmitted;
BSSID[b:c] represent bits b through c inclusive of the BSSID, with
BSSID[47] the last bit transmitted in time in an 802.11 frame;
$\oplus$ is a bitwise exclusive OR operation;
mod X indicates the X-modulo operation;
dec (A[b:c]) is the cast to decimal operator where b is scaled by $2^0$ and c by $2^{c-b}$;
AID is the AID of the recipient station; and
BSSID is the BSSID the station is associated with.

In the above equations, the hash of the BSSID (e.g., offset computed based on the BSSID) is generated by performing an exclusive OR (XOR) on the lowest nibble and the next-lowest nibble of the BSSID (AP MAC address) and then left shifting these four XOR'd bits by 5 bit positions, creating bbbb00000. The modulo sum is then taken of the offset (bbbb00000) and the association identifier (AID). In one example, a BSS with BSSID 00-21-6A-AC-53-52 has a member station assigned AID 5. The partial AID for this station according to the above equation is 229.

In one embodiment, an AP 12 transmitting a VHT SU (single-user) PPDU carrying one or more individually addressed MPDUs (MAC PDUs) or a VHT NDP (null data packet) intended for a single recipient sets a group ID to 63 and the partial AID to the partial AID as calculated above. The partial AID field may be set to the 9 LSBs of the BSSID for station to AP PPDUs. If the client 14 transmits a VHT SU PPDU carrying one or more group addressed MPDUs or if a client within an IBSS (independent BSS) transmits a VHT SU PPDU, the partial AID field may be set to zero, for simplicity and/or power save is not available in these cases.

The above example refers to single-user, however, the embodiments described herein may also be used for multi-user using either multiple hashed AIDs, one for each of the multiple recipient stations, or a hashed identifier for the collection of intended recipients of the MU transmission.

A station that transmits a VHT PPDU to a DLS (direct link setup) or TDLS (tunneled direct link setup) peer station may obtain the AID for the peer station from the DLS setup request, DLS setup response, TDLS setup request or TDLS setup response frame.

Figure 5:
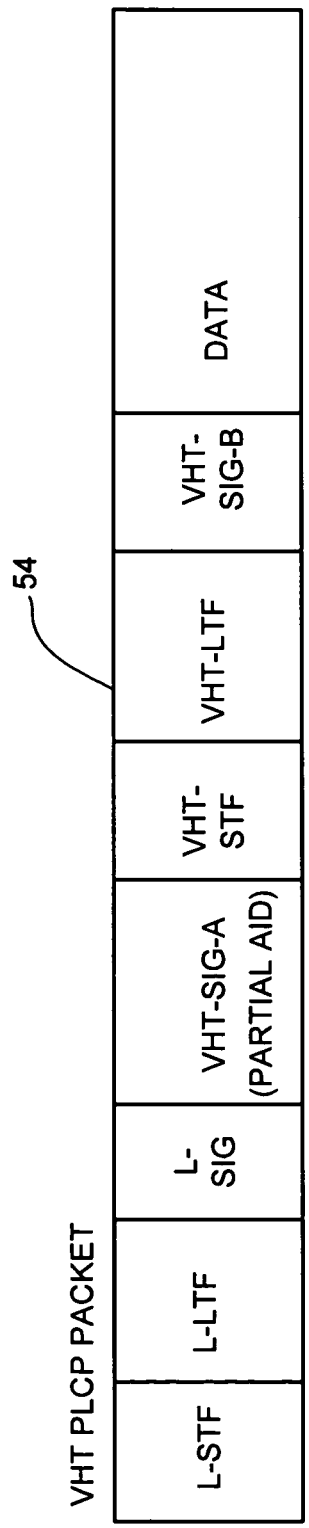
FIG. 5 is an example of a packet containing the partial association identifier.

FIG. 5 is a diagram illustrating one embodiment of a VHT PPDU format for a packet transmitted to the client device 14. The packet 54 includes a header and payload. The header (signal field) is used to communicate frame specific parameters (e.g., coding rate, frame length, etc.) to the receiving device. The payload is the data portion of the packet. In one example, an IEEE 802.11ac packet 54 includes a legacy (non-high throughput) short training field (L-STF), a legacy long training field (L-LTF), a legacy signal field (L-SIG), a very high throughput signal A field (VHT-SIG-A), a very high throughput short training field (VHT-STF), a very high throughput long training field (VHT-LTF), and a very high throughput signal B field (VHT-SIG-B), followed by a data field. The data field may include a PLCP service field. The data field is not present in a VHT null data packet. In one embodiment, the VHT-SIG-A field includes the partial AID, which provides an abbreviated indication of the intended recipient of the frame. It is to be understood that the format shown in FIG. 5 and described herein is only an example and that other formats may be used without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   generating for a client device associated with an access point, a partial association identifier based on an association identifier assigned to the client device and a hash of a basic service set identifier the client device is associated with; and
   transmitting a packet to the client device, the packet comprising the partial association identifier, wherein the partial association identifier indicates that the packet is intended for the client device;

wherein the hash of the basic service set identifier comprises an offset computed based on the basic service set identifier and an exclusive OR of bits of the basic service set identifier and wherein the partial association identifier is equal to a modulo sum of a set number of least significant bits of the association identifier and the offset computed based on the basic service set identifier;

wherein generating the partial association identifier for the client device comprises calculating the partial association identifier that reduces a likelihood of partial association identifier collisions for overlapped access points.

2. The method of claim 1 wherein the offset is equal to $$dec(BSSID[44:47] \oplus BSSID[40:43]) \times 2^5$$

wherein:
BSSID is the basic service set identifier;
BSSID[b:c] represent bits b through c inclusive of the BSSID, with BSSID[47] a last bit transmitted in time in an IEEE 802.11 frame;
$\oplus$ is a bitwise exclusive OR operation; and
dec (A[b:c]) is a cast to decimal operator where b is scaled by $2^0$ and c by $2^{c-b}$.

3. The method of claim 1 wherein the partial association identifier is equal to $$(dec(AID[0:8]) + dec(BSSID[44:47] \oplus BSSID[40:43]) \times 2^5) \bmod 2^9$$

wherein:
AID is the association identifier;
BSSID is the basic service set identifier;
AID [b:c] represents bits b through c inclusive of the AID of the client device with bit 0 being the first transmitted;
BSSID[b:c] represent bits b through c inclusive of the BSSID, with BSSID[47] a last bit transmitted in time in an IEEE 802.11 frame;
$\oplus$ is a bitwise exclusive OR operation;
mod X indicates an X-modulo operation; and
dec (A[b:c]) is a cast to decimal operator where b is scaled by $2^0$ and c by $2^{c-b}$.

4. The method of claim 1 wherein the partial association identifier is located in a physical layer convergence procedure header in the packet.

5. The method of claim 1 wherein the partial association identifier is located in a very high throughput signal field in the packet.

6. An apparatus comprising:
a processor for creating a watch list comprising a partial association identifier generated based on an association identifier assigned to the apparatus and a hash of a basic service set identifier the apparatus is associated with, determining if a received packet contains the partial association identifier on said watch list, and processing the packet if the packet contains the partial association identifier and stopping receiver processing if the packet does not contain the partial association identifier so that the processor sleeps through a remainder of a frame; and
memory for storing the partial association identifier;
wherein the hash of the basic service set identifier comprises an offset computed based on the basic service set identifier; and wherein generating the partial association identifier for the client device comprises calculating the partial association identifier that reduces a likelihood of partial association identifier collisions for overlapped access points.

7. The apparatus of claim 6 wherein the offset is equal to $$dec(BSSID[44:47] \oplus BSSID[40:43]) \times 2^5$$

wherein:
BSSID is the basic service set identifier;
BSSID[b:c] represent bits b through c inclusive of the BSSID, with BSSID[47] a last bit transmitted in time in an IEEE 802.11 frame;
$\oplus$ is a bitwise exclusive OR operation; and
dec (A[b:c]) is a cast to decimal operator where b is scaled by $2^0$ and c by $2^{c-b}$.

8. The apparatus of claim 6 wherein the hash of the basic service set identifier comprises an exclusive OR of bits of the basic service set identifier.

9. The apparatus of claim 6 wherein the partial association identifier is equal to a modulo sum of a set number of least significant bits of the association identifier and the offset computed based on the basic service set identifier.

10. The apparatus of claim 6 wherein the partial association identifier is located in a physical layer convergence procedure header in the packet.

11. The apparatus of claim 6 wherein the partial association identifier is located in a very high throughput signal field in the packet.

12. An apparatus comprising:
a processor for generating a partial association identifier for a client device associated with an access point, the partial association identifier based on an association identifier assigned to the client device and a hash of a basic service set identifier the client device is associated with, and creating a packet for transmittal to the client device, the packet comprising the partial association identifier; and
memory for storing the partial association identifier;
wherein the partial association identifier indicates that the packet is intended for the client device and is equal to:

$$(dec(AID[0:8]) + dec(BSSID[44:47] \oplus BSSID[40:43]) \times 2^5) \bmod 2^9$$

wherein:
AID is the association identifier;
BSSID is the basic service set identifier;
AID [b:c] represents bits b through c inclusive of the AID of the client device with bit 0 being a first transmitted;
BSSID[b:c] represent bits b through c inclusive of the BSSID, with BSSID[47] a last bit transmitted in time in an IEEE 802.11 frame;
$\oplus$ is a bitwise exclusive OR operation;
mod X indicates an X-modulo operation; and
dec (A[b:c]) is a cast to decimal operator where b is scaled by $2^0$ and c by $2^{c-b}$.

13. The apparatus of claim 12 wherein the partial association identifier is located in a physical layer convergence procedure header in the packet.

14. The apparatus of claim 12 wherein the packet is an IEEE 802.11ac packet.

\* \* \* \* \*